US011680528B2

(12) United States Patent
Ryon et al.

(10) Patent No.: US 11,680,528 B2
(45) Date of Patent: Jun. 20, 2023

(54) INTERNALLY-MOUNTED TORCH IGNITERS WITH REMOVABLE IGNITER HEADS

(71) Applicant: Delavan Inc., Des Moines, IA (US)

(72) Inventors: Jason Ryon, Carlisle, IA (US); Lev Alexander Prociw, Johnston, IA (US); Steve Myers, Norwalk, IA (US); Andy M. Tibbs, Earlham, IA (US); Brandon P. Williams, Johnston, IA (US)

(73) Assignee: Delavan Inc., Des Moines, IA (US)

( * ) Notice: Subject to any disclaimer, the term of this patent is extended or adjusted under 35 U.S.C. 154(b) by 0 days.

(21) Appl. No.: 17/127,236

(22) Filed: Dec. 18, 2020

(65) Prior Publication Data
US 2022/0195937 A1 Jun. 23, 2022

(51) Int. Cl.
*F02C 7/264* (2006.01)
*F02C 7/18* (2006.01)
(Continued)

(52) U.S. Cl.
CPC ............... *F02C 7/264* (2013.01); *F02C 7/18* (2013.01); *F02C 7/22* (2013.01); *F02C 7/28* (2013.01);
(Continued)

(58) Field of Classification Search
CPC .. F23R 3/283; F23R 3/045; F23R 3/16; F23R 3/343; F23R 3/14; F23R 3/20; F23R 3/28;
(Continued)

(56) References Cited

U.S. PATENT DOCUMENTS 2,540,642 A 2/1951 Sidney et al.
2,541,900 A 2/1951 Williams
(Continued)

FOREIGN PATENT DOCUMENTS

DE 1064760 B 9/1959
DE 102018214281 B3 8/2019
(Continued)

OTHER PUBLICATIONS

"Metal Seal Design Guide—High Performance Engineered Seals and Sealing Systems", from Parker Hannlfin Corporation Composite Sealing Systems Division, 2016, 106 pages.
(Continued)

*Primary Examiner* — Craig Kim
(74) *Attorney, Agent, or Firm* — Kinney & Lange, P.A.

(57) ABSTRACT

A torch igniter for a combustor of a gas turbine engine includes an igniter body and an igniter head. The igniter body is disposed within a high-pressure case of a gas turbine engine and extends primarily along a first axis, and includes an annular wall and an outlet wall. The annular wall surrounds the first axis and defines a radial extent of a combustion chamber therewithin. The outlet wall is disposed at a downstream end of the annular wall, defines a downstream extent of the combustion chamber, and includes an outlet fluidly communicating between the combustion chamber and an interior of the combustor. The igniter head is removably attached to the igniter body at an upstream end of the annular wall, wherein the igniter head defines an upstream extent of the combustion chamber, and includes an ignition source and a fuel injector.

20 Claims, 7 Drawing Sheets

(51) Int. Cl.
*F02C 7/22* (2006.01)
*F02C 7/28* (2006.01)
*F23R 3/28* (2006.01)

(52) U.S. Cl.
CPC .......... *F23R 3/283* (2013.01); *F05D 2240/35* (2013.01); *F05D 2240/55* (2013.01); *F05D 2260/201* (2013.01); *F05D 2260/232* (2013.01); *F05D 2260/30* (2013.01); *F05D 2260/99* (2013.01); *F23R 2900/03043* (2013.01); *F23R 2900/03044* (2013.01)

(58) Field of Classification Search
CPC .... F02C 7/26; F02C 7/264; F02C 7/18; F02C 7/22; F02C 7/28; F02C 7/266
See application file for complete search history.

(56) References Cited

U.S. PATENT DOCUMENTS

| | | |
|---|---|---|
| 2,645,082 A | 7/1953 | Sarto |
| 2,648,951 A | 8/1953 | McDugal |
| 2,734,341 A | 2/1956 | Lovesey |
| 2,784,553 A | 3/1957 | De et al. |
| 2,811,676 A | 10/1957 | Beye |
| 2,840,742 A | 6/1958 | Watters |
| 2,847,826 A | 8/1958 | Dennis |
| 2,864,234 A | 12/1958 | Seglem et al. |
| 2,885,859 A | 5/1959 | Fortunato |
| 2,958,196 A | 11/1960 | Wie et al. |
| 2,967,224 A | 1/1961 | Irwin |
| 3,009,321 A | 11/1961 | Jones et al. |
| 3,487,636 A | 1/1970 | Vdoviak et al. |
| 3,558,251 A | 1/1971 | Bauger et al. |
| 3,690,093 A | 9/1972 | Carlisle |
| 3,898,797 A | 8/1975 | Wood |
| 3,954,389 A | 5/1976 | Szetela |
| 3,990,834 A | 11/1976 | Dubell et al. |
| 4,012,904 A | 3/1977 | Nogle |
| 4,099,373 A | 7/1978 | Griffin et al. |
| 4,112,675 A | 9/1978 | Pillsbury et al. |
| 4,141,213 A | 2/1979 | Ross |
| 4,192,139 A | 3/1980 | Buchheim |
| 4,194,358 A | 3/1980 | Stenger |
| 4,351,156 A | 9/1982 | White et al. |
| 4,412,414 A | 11/1983 | Novick et al. |
| 4,441,323 A | 4/1984 | Colley |
| 4,828,488 A | 5/1989 | Reiser et al. |
| 4,860,533 A | 8/1989 | Joshi |
| 4,912,931 A | 4/1990 | Joshi et al. |
| 4,915,615 A | 4/1990 | Kawamura et al. |
| 5,085,040 A | 2/1992 | Tilston |
| 5,390,855 A * | 2/1995 | Mims ............ F23D 14/60 251/100 |
| 5,469,700 A | 11/1995 | Corbett et al. |
| 5,499,497 A | 3/1996 | DeFreitas |
| 5,636,511 A | 6/1997 | Pfefferle et al. |
| 5,640,841 A | 6/1997 | Crosby |
| 5,673,554 A | 10/1997 | Defreitas et al. |
| 5,695,328 A * | 12/1997 | DeFreitas ............ F02C 7/264 431/258 |
| 5,720,163 A | 2/1998 | Pfefferle et al. |
| 5,744,206 A | 4/1998 | Russek et al. |
| 5,845,480 A * | 12/1998 | DeFreitas ............ F02P 23/04 60/776 |
| 6,138,654 A | 10/2000 | Pretorius et al. |
| 6,195,247 B1 | 2/2001 | Cote et al. |
| 6,240,731 B1 | 6/2001 | Hoke et al. |
| 6,247,300 B1 | 6/2001 | Muramatsu et al. |
| 6,483,022 B1 | 11/2002 | Packard |
| 6,884,967 B1 | 4/2005 | Leigh |
| 6,915,638 B2 | 7/2005 | Runkle et al. |
| 6,952,927 B2 | 10/2005 | Howell et al. |
| 6,968,699 B2 | 11/2005 | Howell et al. |
| 7,124,724 B2 | 10/2006 | Fleetwood |
| 7,137,255 B2 | 11/2006 | Schmotolocha et al. |
| 7,216,488 B2 | 5/2007 | Howell et al. |
| 7,470,875 B1 | 12/2008 | Wilcox et al. |
| 7,481,248 B2 | 1/2009 | Prociw et al. |
| 7,637,094 B2 | 12/2009 | Costello et al. |
| 8,365,710 B2 | 2/2013 | Lykowski et al. |
| 8,713,944 B2 | 5/2014 | Bleeker |
| 9,080,772 B2 | 7/2015 | Prociw et al. |
| 9,135,755 B2 | 9/2015 | Youssef |
| 9,279,398 B2 | 3/2016 | McAlister |
| 9,413,141 B2 | 8/2016 | Leglaye et al. |
| 9,453,491 B2 | 9/2016 | Tanaka et al. |
| 9,476,399 B1* | 10/2016 | Munson ............ F02P 23/00 |
| 9,567,912 B2* | 2/2017 | Prociw ............ F02C 7/266 |
| 10,041,859 B2 | 8/2018 | Desilva et al. |
| 10,156,189 B2 | 12/2018 | Sze et al. |
| 10,488,047 B2 | 11/2019 | Ott et al. |
| 10,584,639 B2 | 3/2020 | Dam et al. |
| 10,711,699 B2* | 7/2020 | Dam ............ F02C 7/18 |
| 10,823,398 B2 | 11/2020 | Choudhri et al. |
| 11,209,164 B1 | 12/2021 | Ryon et al. |
| 11,226,103 B1* | 1/2022 | Ryon ............ F02C 3/04 |
| 11,255,535 B1 | 2/2022 | Eckert et al. |
| 2002/0050061 A1 | 5/2002 | Komyoji et al. |
| 2002/0162333 A1 | 11/2002 | Zelina |
| 2004/0050061 A1* | 3/2004 | Schmotolocha ......... F23R 3/20 60/761 |
| 2004/0168442 A1 | 9/2004 | Schmotolocha et al. |
| 2005/0053876 A1 | 3/2005 | Joos et al. |
| 2005/0166595 A1 | 8/2005 | Fletcher et al. |
| 2005/0284442 A1* | 12/2005 | Stuttaford ............ F02C 7/266 123/297 |
| 2006/0054233 A1 | 3/2006 | Prociw et al. |
| 2006/0168967 A1 | 8/2006 | Simons et al. |
| 2008/0036209 A1 | 2/2008 | Bulkovitch |
| 2008/0141651 A1 | 6/2008 | Eason et al. |
| 2008/0299504 A1 | 12/2008 | Horn |
| 2009/0234555 A1 | 9/2009 | Williams et al. |
| 2009/0314000 A1 | 12/2009 | Evulet et al. |
| 2010/0043444 A1 | 2/2010 | Gross et al. |
| 2010/0071343 A1 | 3/2010 | Yu |
| 2010/0126617 A1 | 5/2010 | Stroempl et al. |
| 2011/0088409 A1 | 4/2011 | Carlisle |
| 2011/0113787 A1 | 5/2011 | Milosavljevic |
| 2011/0247341 A1 | 10/2011 | McMahan et al. |
| 2011/0247590 A1 | 10/2011 | Donovan |
| 2011/0271684 A1 | 11/2011 | Corsmeier et al. |
| 2012/0085468 A1 | 4/2012 | Walker |
| 2012/0125008 A1 | 5/2012 | Prociw et al. |
| 2013/0000323 A1 | 1/2013 | Kupratis |
| 2013/0040255 A1 | 2/2013 | Shi et al. |
| 2013/0143171 A1 | 6/2013 | Soda et al. |
| 2013/0174562 A1 | 7/2013 | Holcomb et al. |
| 2013/0283800 A1 | 10/2013 | Romig et al. |
| 2014/0060063 A1 | 3/2014 | Boardman et al. |
| 2014/0150401 A1 | 6/2014 | Venter |
| 2014/0215997 A1 | 8/2014 | Lior et al. |
| 2014/0216384 A1 | 8/2014 | Tanaka et al. |
| 2014/0260304 A1 | 9/2014 | Cummings et al. |
| 2014/0290259 A1 | 10/2014 | Plante et al. |
| 2014/0314548 A1 | 10/2014 | Rivers et al. |
| 2014/0366505 A1* | 12/2014 | Prociw ............ F02C 7/266 60/39.821 |
| 2014/0366542 A1 | 12/2014 | Teets |
| 2014/0366551 A1 | 12/2014 | Prociw et al. |
| 2015/0036781 A1 | 2/2015 | Youssef |
| 2015/0040575 A1 | 2/2015 | Martinez Fabre et al. |
| 2015/0260406 A1 | 9/2015 | Carrere |
| 2015/0275755 A1 | 10/2015 | Ogata et al. |
| 2015/0275769 A1 | 10/2015 | Foutch et al. |
| 2015/0308351 A1 | 10/2015 | Sheridan |
| 2015/0345426 A1 | 12/2015 | Houston et al. |
| 2015/0345788 A1 | 12/2015 | Miyata et al. |
| 2015/0354517 A1 | 12/2015 | Mansour et al. |
| 2016/0003150 A1 | 1/2016 | Dicintio et al. |
| 2016/0010559 A1 | 1/2016 | Hoke et al. |
| 2016/0047318 A1 | 2/2016 | Dam et al. |
| 2016/0084169 A1 | 3/2016 | Stuttaford et al. |
| 2016/0169110 A1 | 6/2016 | Myers et al. |

(56) References Cited

U.S. PATENT DOCUMENTS

| | | |
|---|---|---|
| 2016/0230993 A1 | 8/2016 | Dai et al. |
| 2017/0082022 A1 | 3/2017 | Lee |
| 2017/0138266 A1 | 5/2017 | Caples |
| 2017/0145852 A1 | 5/2017 | McCune et al. |
| 2017/0284298 A1 | 10/2017 | Suciu et al. |
| 2017/0298822 A1 | 10/2017 | Garde La Casa |
| 2017/0350590 A1 | 12/2017 | Choudhri et al. |
| 2017/0356656 A1 | 12/2017 | Ogata et al. |
| 2018/0003388 A1 | 1/2018 | Park |
| 2018/0010795 A1* | 1/2018 | Nath ................. F23R 3/18 |
| 2018/0051710 A1 | 2/2018 | Takamura et al. |
| 2018/0058224 A1 | 3/2018 | Jennings et al. |
| 2018/0058331 A1 | 3/2018 | Barton et al. |
| 2018/0058404 A1 | 3/2018 | Tibbs |
| 2018/0100437 A1 | 4/2018 | Dicintio et al. |
| 2018/0134407 A1 | 5/2018 | Elbibary et al. |
| 2018/0154446 A1 | 6/2018 | Brown et al. |
| 2018/0170575 A1 | 6/2018 | Ziarno |
| 2018/0172271 A1 | 6/2018 | Moniz et al. |
| 2018/0179896 A1 | 6/2018 | Pal et al. |
| 2018/0179956 A1 | 6/2018 | Wertz |
| 2018/0283692 A1 | 10/2018 | Ryon et al. |
| 2018/0356095 A1 | 12/2018 | Patel et al. |
| 2018/0363555 A1* | 12/2018 | Zelina ................. F23R 3/005 |
| 2019/0010872 A1* | 1/2019 | Dam ................. F23R 3/14 |
| 2019/0024897 A1 | 1/2019 | Prociw et al. |
| 2019/0032561 A1* | 1/2019 | Stoia ................. F23R 3/42 |
| 2019/0178497 A1 | 6/2019 | Jones et al. |
| 2019/0249877 A1 | 8/2019 | Fryer |
| 2020/0080530 A1 | 3/2020 | Freer et al. |
| 2020/0088409 A1 | 3/2020 | Greenfield et al. |
| 2020/0191059 A1 | 6/2020 | Ryon et al. |
| 2020/0309378 A1 | 10/2020 | Dam et al. |
| 2020/0348024 A1* | 11/2020 | Hicks ................. F23R 3/50 |
| 2021/0215100 A1* | 7/2021 | Head ................. F23R 3/045 |
| 2022/0007488 A1 | 1/2022 | Bai et al. |

FOREIGN PATENT DOCUMENTS

| | | |
|---|---|---|
| EP | 2189720 A1 | 5/2010 |
| EP | 3128166 A1 | 2/2017 |
| EP | 2677240 B1 | 4/2020 |
| FR | 970988 A | 1/1951 |
| FR | 1218296 A | 5/1960 |
| GB | 693846 A | 7/1953 |
| GB | 791990 A | 3/1958 |
| GB | 819141 A | 8/1959 |
| GB | 859184 A | 1/1961 |
| JP | 2015021715 A | 2/2015 |
| KR | 101279722 B1 | 6/2013 |

OTHER PUBLICATIONS

Database WPI—2017 Clarivate Analytics, Week 201919, Thomson Scientific, London GB; AN 2019-17673X XP002806356, 2 pages.
Extended European Search Report for EP Application No. 21215655.8, dated May 2, 2022, 8 pages.
Extended European Search Report for EP Application No. 21215709.3, dated May 12, 2022, 9 pages.
Extended European Search Report for EP Application No. 21201782.6, dated Mar. 28, 2022, 10 pages.
Extended European Search Report for EP Application No. 21205035.5, dated Mar. 28, 2022, 9 pages.
Extended European Search Report for EP Application No. 21214138.6, dated Apr. 25, 2022, 7 pages.
Extended European Search Report for EP Application No. 21212869.8, dated Apr. 28, 2022, pp. 7.
Extended European Search Report for EP Application No. 21213899.4, dated May 6, 2022, 8 pages.
Extended European Search Report for EP Application No. 21214511 4, dated Apr. 29, 2022, 8 pages.
Extended European Search Report for EP Application No. 21214798.7, dated May 11, 2022, 8 pages.
Extended European Search Report for EP Application No. 21214894.4, dated May 3, 2022, 9 pages.
Extended European Search Report for EP Application No. 21214883.7, dated May 13, 2022, pp. 10.
Extended European Search Report for EP Application No. 21216163.2, dated May 16, 2022, 8 pages.
Extended European Search Report for EP Application No. 21209057.5, dated Jul. 19, 2022, 8 pages.
Extended European Search Report for EP Application No. 21192156.4, dated Feb. 1, 2022, 7 pages.
Extended European Search Report for EP Application No. 21205393.8, dated Mar. 17, 2022, 8 pages.

* cited by examiner

INTERNALLY-MOUNTED TORCH IGNITERS WITH REMOVABLE IGNITER HEADS

BACKGROUND

The present disclosure relates to gas turbine engines and, more particularly, to cooling arrangements suitable for torch igniters used in the combustor section of a gas turbine engine.

Torch igniters can be used in lieu of spark igniters to provide an ignition source for combustors located in gas turbine engines. Torch igniters provide a flame as an ignition source for a combustor rather than the electric current provided by spark igniters. Consequently, torch igniters can provide a larger target for fuel injectors used in a combustor, permitting the use of a greater range of fuel injector designs. However, due to their location in a gas turbine engine, torch igniters and their components can experience temperatures exceeding 3000-4000° F.

SUMMARY

In one embodiment, a torch igniter for a combustor of a gas turbine engine includes an igniter body and an igniter head. The igniter body is disposed within a high-pressure case of a gas turbine engine and extends primarily along a first axis, and includes an annular wall and an outlet wall. The annular wall surrounds the first axis and defines a radial extent of a combustion chamber therewithin. The outlet wall is disposed at a downstream end of the annular wall, defines a downstream extent of the combustion chamber, and includes an outlet fluidly communicating between the combustion chamber and an interior of the combustor. The igniter head is removably attached to the igniter body at an upstream end of the annular wall, wherein the igniter head defines an upstream extent of the combustion chamber, and includes an ignition source extending at least partially into the combustion chamber and a fuel injector configured to inject fuel into the combustion chamber with an orientation impinging on the ignition source.

The present summary is provided only by way of example, and not limitation. Other aspects of the present disclosure will be appreciated in view of the entirety of the present disclosure, including the entire text, claims, and accompanying figures.

Figure 1:
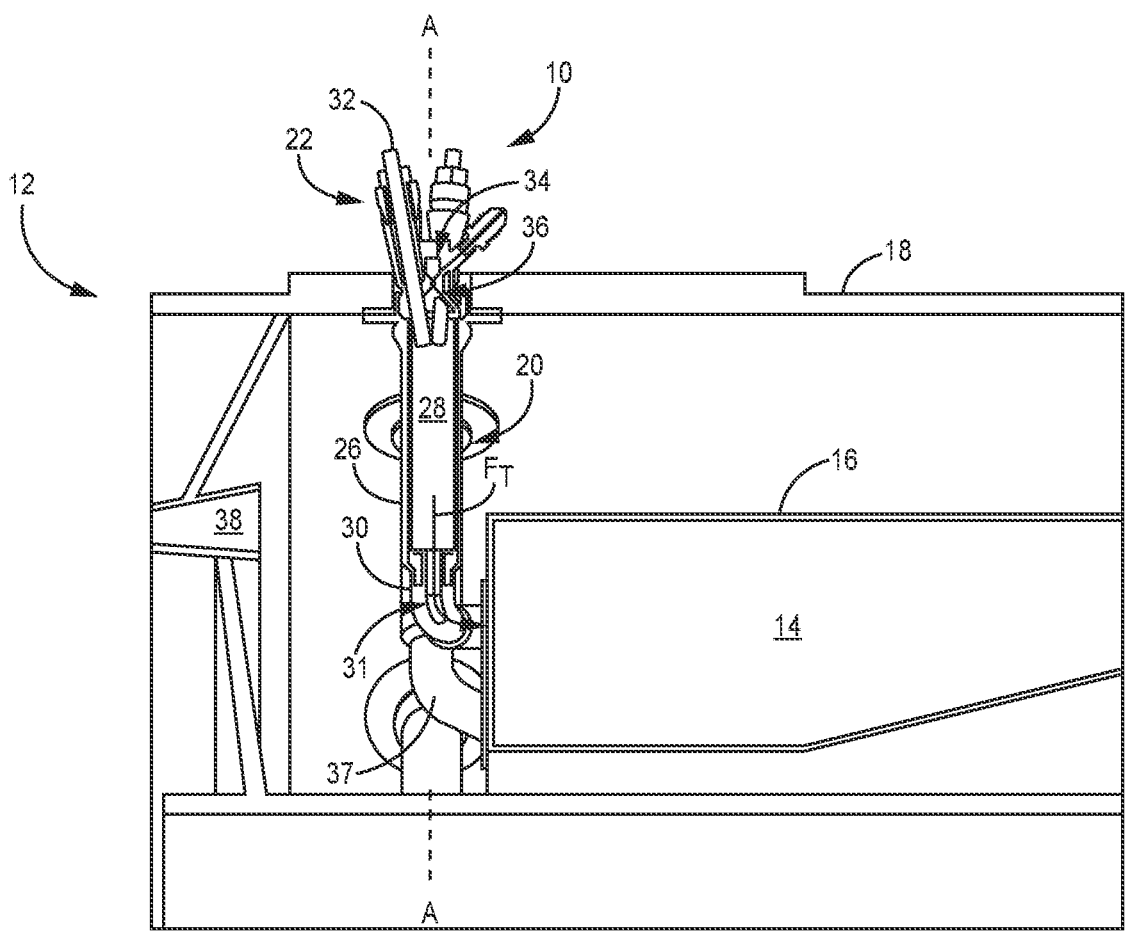
FIG. 1 is a cross-sectional view of an example of a torch igniter having a removable igniter head.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present disclosure presents structures and methods for torch igniters mounted inside the high-pressure case of the combustion section of a gas turbine engine. These structures and methods use a removable igniter head to simplify maintenance of torch igniters and protect temperature-sensitive electrical connections from the high-temperature conditions of the high-pressure case, while allowing the combustion chamber of torch igniters to be located inside of the high-pressure case. Further, these structures and methods allow for the construction of seals to prevent the flow of air from inside the high-pressure case or the torch combustion chamber to the exterior of the high-pressure case and around the removable igniter head.

FIG. 1 is a cross-sectional view of torch igniter 10, which is located in combustion section 12 of a gas turbine engine. Torch igniter 10 is connected to combustor 14 through combustor liner 16 and mounted partially internal to high-pressure case 18. Torch igniter 10 includes igniter body 20, which extends from an internal surface of high-pressure case 18 to the dome of combustor 14, and igniter head 22, which extends outside of high-pressure case 18. Igniter body 20 includes housing 26, which is generally annular and defines a radial extent of combustion chamber 28. Housing 26 extends along and is centered on axis A-A. Housing 26 is connected to outlet housing 30, which is generally annular and defines a radial extent of outlet passage 31. Outlet passage 31 is disposed at the downstream end of combustion chamber 28 and fluidly connects combustion chamber 28 of torch igniter 10 to the interior volume of combustor 14. Outlet housing 30 is slidingly connected to liner 16, which allows for thermal expansion of liner 16 and outlet housing 30 as they reach the operating temperature of the gas turbine engine. Igniter head includes surface igniter 32, fuel injector 34, and igniter cap 36. Igniter cap 36 is disposed at the upstream end of combustion chamber 28 along axis A-A and forms the upstream extent of combustion chamber 28.

In operation, fuel injector 34 injects fuel that impinges on hot surface igniter 32 to ignite the fuel and create combustion gases. Generally, fuel injector 34 is configured to flow fuel at relatively low flow rates to reduce fuel consumption of torch igniter 10. For example, fuel injector 34 can supply approximately 1 lb. of fuel per hour during pre-takeoff startup and 10 lbs. of fuel per hour during takeoff or continuous operation.

The combustion gases exit combustion chamber 28 through outlet passage 31 and to an interior volume of combustor 14 according to flow path $F_T$. As shown in FIG. 1, outlet passage 31 is disposed adjacent to main fuel injector 37, which flows fuel at relatively high flow rates for combustion within combustor 14. Generally, outlet passage 31 is configured to flow hot combustion gases into a volume of combustor 14 that is within the injection pattern of fuel injected by main fuel injector 37 so that combustion gases from torch igniter 10 ignite fuel from main fuel injector 37 and thereby initiate combustion within combustor 14. High-pressure air for use with combustor 14 is supplied to the interior of high-pressure case 18 through diffuser 38.

Combustion gases generated in combustion chamber 28 are generally at a relatively high pressure. Air inside high-pressure case 18 is also generally at a relatively high pressure, while air outside high-pressure case 18 is generally at a relatively low pressure. In configurations of torch igniter 10 where igniter body 20 is mounted fully or partially externally to high-pressure case 18, the portion of housing 26 external to high-pressure case 18 must be relatively thick to resist deforming due to the pressure difference between high-pressure gases in combustion chamber 28 and low-pressure air outside of high-pressure case 18. Conversely, in examples where igniter body 20 is mounted internally to high-pressure case 18, such as the example shown in FIG. 1, housing 26 does not need to be as relatively thick to resist pressure-induced deformation, as combustion gases in combustion chamber 28 and air inside high-pressure case 18 are both at a relatively high pressure. Consequently, examples of igniter body 20 that are mounted inside high-pressure case 18 allow for housing 26 and outlet housing 30 to be relatively thin, reducing the overall weight of torch igniter 10.

Surface igniters 32 can be any type of igniter suitable for igniting fuel in torch combustion chamber 28, and in some examples can be spark igniters. In the illustrated embodiment, surface igniter 32 is an electrothermal ignition source, such as a glow plug, capable of being resistively heated by an electrical power source. Generally, surface igniter 32 is composed of a material capable of being non-destructively resistively heated. The material can be a ceramic material, such as silicon nitride.

In FIG. 1, surface igniter 32 is rod-shaped and an interior end of surface igniter 32 extends into combustion chamber 28, while the exterior end extends away from combustion chamber 28 and outside of high-pressure case 18. Generally, the electrical power source is connected to surface igniter 32 at the exterior end of surface igniter 32. In configurations of torch igniter 10 where torch head 22 is disposed inside of high-pressure case 18, the high-temperature air inside high-pressure case 18 can damage the connections between the power source and the exterior end of surface igniter 32. The configuration of torch igniter 10 shown in FIG. 1 advantageously allows torch head 22 to extend through an aperture in high-pressure case 18, exposing those connections only to the relatively low-temperature air outside of high-pressure case 18.

In the depicted example, housing 26 and cap 36 are centered on and extend along axis A-A. Outlet housing 30 and outlet passage 31 extend along axis A-A adjacent to housing 26 combustion chamber 28 and turn to extend transversely transverse to axis A-A where outlet housing 30 is connected to the dome of combustor 14. This orientation allows for igniter body 20 to be disposed inside of high-pressure case 18 and for igniter head 22 to extend outside of high-pressure case 18, while providing for the connection between outlet housing 30 and outlet passage 31 and combustor 14. However, it should be understood that housing 26, cap 36, and outlet housing 30 can have other orientations that allow igniter body 20 to be disposed inside of high-pressure case 18 and for igniter head 22 to extend outside of high-pressure case 18.

Advantageously, torch igniter 10 can operate continuously during the entire operation time of the gas turbine engine in which it is located. Continuous operation allows torch igniter 10 to easily facilitate altitude re-lights of combustor 14 by acting as a pilot light for fuel ignition within combustor 14. Further, torch igniter 10 can operate continuously with a self-sustaining flame. The self-sustaining flame can be maintained without requiring operation of surface igniters 32 by adding additional fuel to combustion chamber 28. Combustion gases already present in combustion chamber 28 ignite added fuel to create the self-sustaining flame.

Figure 2:
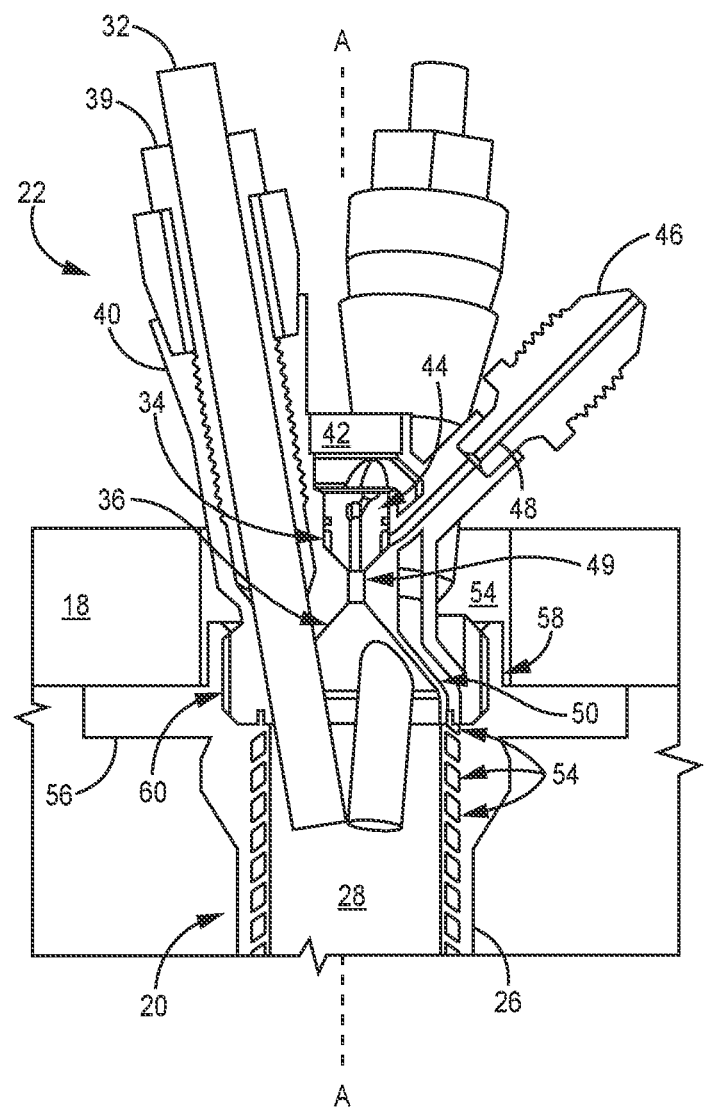
FIG. 2 is a cross-sectional view of an example of the removable igniter head of the torch igniter of FIG. 1.
Figure 3:
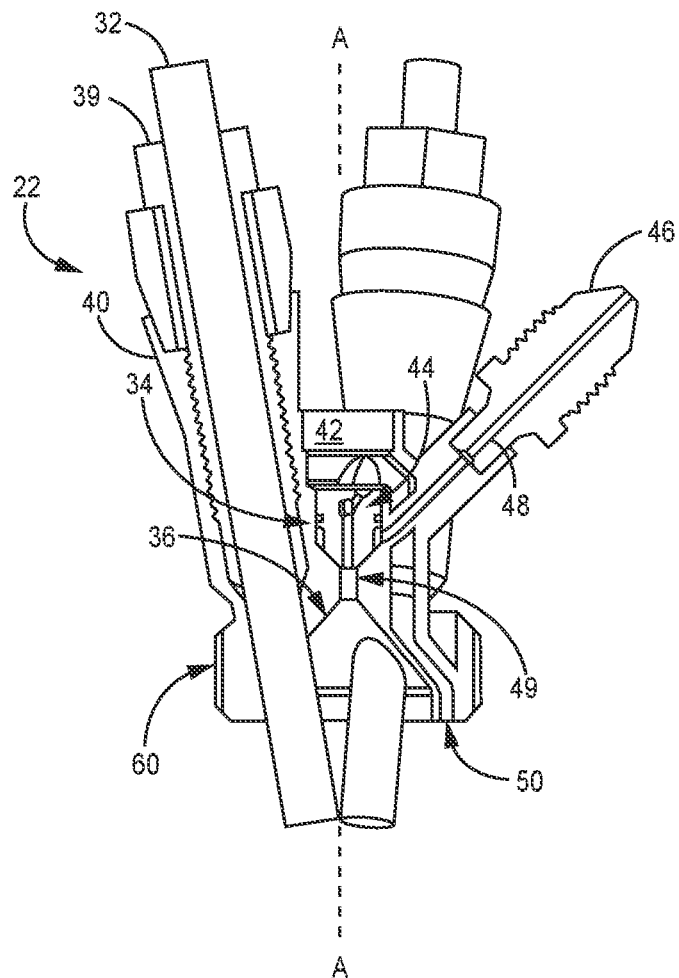
FIG. 3 is a cross-sectional view of an example of the removable igniter head of FIG. 2 detached from an igniter body of the torch igniter.

FIG. 2 is a cross-sectional views of torch igniter 10 that more clearly illustrates the interface between igniter body 20 and igniter head 22. Also shown more clearly in FIG. 2 are igniter sheath 39, igniter housing 40, air inlet 42, air channel 44, fuel inlet 46, fuel channel 48, injector aperture 49, cooling channels 50 and 52, aperture 54 in high-pressure case 18, sealing flange 56, receiving structure 58, and attachment portion 60. FIG. 3 similarly illustrates igniter head 22 in isolation, detached from igniter body 20.

Generally, a surface igniter 32 is mounted to igniter head 22 via igniter housing 40. Igniter housing 40 receives surface igniter 32 and allows surface igniter 32 to extend into combustion chamber 28. Surface igniter 32 may be removably attached to igniter housing 40, such as by a screw attachment, or may be non-removably attached to igniter housing 40. Igniter sheath 39 has an annular structure and surrounds the portion of surface igniter 32 extending through igniter housing 40. Igniter sheath 39 may be attached non-removably to surface igniter 32, such as by brazing, or may be removably attached by suitable means. In the depicted example, igniter sheath 39 is removably mounted to igniter housing 40 via a screw attachment. However, it should be understood any suitable connection may be used. Likewise, igniter sheath 39 may be non-removably attached, such as by brazing or welding. Alternatively, surface igniter 32 may be attached directly to igniter housing 40. Where surface igniter 32 is directly attached to igniter housing 40 it may be removably attached, such as by a screw attachment, or non-removably attached, such as by brazing or welding. Configurations that allow for surface igniter 32 to be removed from igniter head 22 simplify replacement of a surface igniter 32 that has become inoperable through, for example, damage or wear to the surface igniter 32. Configurations in which surface igniter 32 is not removable from igniter head 22 have improved sealing where surface igniter 32 is mounted to igniter head 22, reducing the potential for the flow of high-pressure combustion gases through igniter housing 40.

Air inlet 42 intakes air from a source of compressed air, such as the air within high-pressure case 18 or an auxiliary air compressor. A portion of the air flow through air channel 44 is for use in fuel injector 34, as will be described subsequently. The remainder of the air flows through channel 50, which extends generally along axis A-A through igniter head 22. Channel 50 is aligned with and directly fluidly connected to channels 52. Air flowing through channel 50 can be used to cool cap 36, which is exposed to hot combustion gases generated in combustion chamber 28. The cooling provided by channel 50 allows igniter head 22, including cap 36, to be fabricated from a high-temperature metal material. However, cap 36 can alternatively be fabricated from a ceramic material and joined to igniter head 22 via a later manufacturing step.

Channels 52 are helically-shaped and extend through the length of housing 26. Air flowing through channels 52 is used to cool the inner surface of housing 26, which is exposed to the hot combustion gases generated in combustion chamber 28. The helical shape increases the total surface area of channels 52 available to cool housing 26, and circumferentially distributes airflow through each channel 52 for more even distribution of cooling. Adjacent portions of channels 52 are separated by fins that are thermally connected to the interior surface of housing 26, further increasing the total surface area available for cooling.

Fuel inlet 46 intakes a fuel suitable for generating combustion gases in combustion chamber 28. In the depicted example, fuel inlet 46 of igniter head 22 is configured to take in a liquid fuel such as conventional diesel, biodiesel, kerosene, naphtha, or a blend of any of the aforementioned fuels. The liquid fuel can also be, for example, a jet fuel. However, it should be understood that in other examples igniter head 22 can be configured to use a variety of fuels, including gaseous fuels. Liquid fuel received at fuel inlet 46 flows through fuel channel 48. The liquid fuel mixes with air in an annulus defined within fuel injector 34 to atomize the liquid fuel before it is injected. Atomizing the liquid fuel improves the combustion efficiency of the liquid fuel. The resulting air/liquid fuel mixture is injected into combustion chamber 28 through injector aperture 49. Injector aperture 49 is configured to cause the air/liquid fuel mixture to impinge on hot surface igniters 32.

In other examples, torch igniter 10 can utilize a gaseous fuel rather than a liquid fuel. The gaseous fuel can be, for example, natural gas, hydrogen, ammonia, liquid hydrogen, syngas, or a blend of any of the aforementioned fuels. In these examples, torch head 22 can be equipped with a gaseous fuel inlet and a gaseous fuel channel capable of channeling gaseous fuel from the inlet to injector aperture 49.

Injector head extends through aperture 54 of high-pressure case 18. To prevent undesirable flow of air from the interior of high-pressure case 18 to the exterior of high-pressure case 18 through aperture 54, sealing flange 56 of igniter body 20 forms a seal with the inner surface of high-pressure case 18. The seal can be formed by, for example, a c-seal or a crush seal disposed between sealing flange 56 and the inner surface of high-pressure case 18. As the pressure of air inside of high-pressure case 18 is generally much higher than the pressure of air outside of high-pressure case 18, positioning sealing flange 56 inside of high-pressure case 18 allows the pressure of air inside of high-pressure case 18 to press sealing flange 56 against the inside of high-pressure case 18, eliminating the need for additional attachments between sealing flange 56 and high-pressure case 18 to seal sealing flange 56 against high-pressure case 18. However, it should be understood that sealing flange 56 can be mounted on the exterior of high-pressure case 18 and attached to high-pressure case via bolts, screws, or another suitable means of attachment. Sealing flange 56 is can have an annular shape, as depicted in FIG. 2, or any other shape suitable for sealing against the inner surface of high-pressure case 18. Generally, another auxiliary attachment means (e.g., bolts, screws, or other suitable means of attachment) is also required to mechanically retain sealing flange 56 or another portion of igniter body 20 to high-pressure case 18. However, it should be understood that the auxiliary attachment means is not required to create a seal due to sealing flange 56. Rather, the auxiliary attachment means functions to secure igniter body 20 against, for example, significant vibrations or g-forces that can occur during gas turbine operation.

Advantageously, igniter body 20 can be removably attached to igniter head 22. This allows for maintenance and replacement of components of igniter head 22 without requiring removal of igniter body 20. In the example depicted in FIGS. 1-2, removing igniter body 20 would require an additional aperture to be formed through high-pressure case 18, which would require its own sealing structure. Notably, components of igniter body 20, such as housing 26 or outlet housing 30, are less likely to need maintenance than the components of igniter head 22. For example, the material of a surface igniter 32 can degrade, negatively affecting the ability of surface igniter 32 to be resistively heated. Similarly, fuel injector 34 can experience coking, potentially creating an undesirable asymmetric injection pattern that may not include a surface igniter 32, negatively affecting the ability of torch igniter 10 to generate combustion gases. Notably, both surface igniter 32 and fuel injector 34 are located in igniter head 22. Consequently, if surface igniter 32, fuel injector 34, or another component of igniter head 22 has been damaged or otherwise requires maintenance, igniter head 22 can be swapped for a new torch igniter head, decreasing the non-operational time of the gas turbine engine in which torch igniter 10 is disposed. As such, the configuration of torch igniter 10 shown in FIGS. 1-2 advantageously allows for removal of igniter head 22 while simplifying the sealing structure required to prevent air loss through aperture 54 by integrating sealing flange 56 into igniter body 20.

Igniter head 22 is removably attached by attachment portion 60, which is attached to receiving structure 58 of igniter body 20. Receiving structure 58 and attachment portion 60 are depicted as annular and centered on axis A-A. However, it should be understood that receiving structure 58 and attachment portion 60 can be any shape and in any suitable orientation for removably attaching igniter head 22 to igniter body 20. When attached, receiving structure 58 and attachment portion 60 form a seal that prevents flow of combustion gases from combustion chamber 28 through aperture 54 and into an exterior of high-pressure case 18. The seal may be formed by the attachment of receiving structure 58 and attachment portion 60 alone. For example, receiving structure 58 and attachment portion 60 can be affixed by a screw attachment and the screw attachment itself can function as a seal. Alternatively, a separate sealing structure can be disposed in the interface between receiving structure 58 and attachment portion 60 to create the seal. For example, the seal can be created by a c-seal or a crush seal.

Figure 4A:
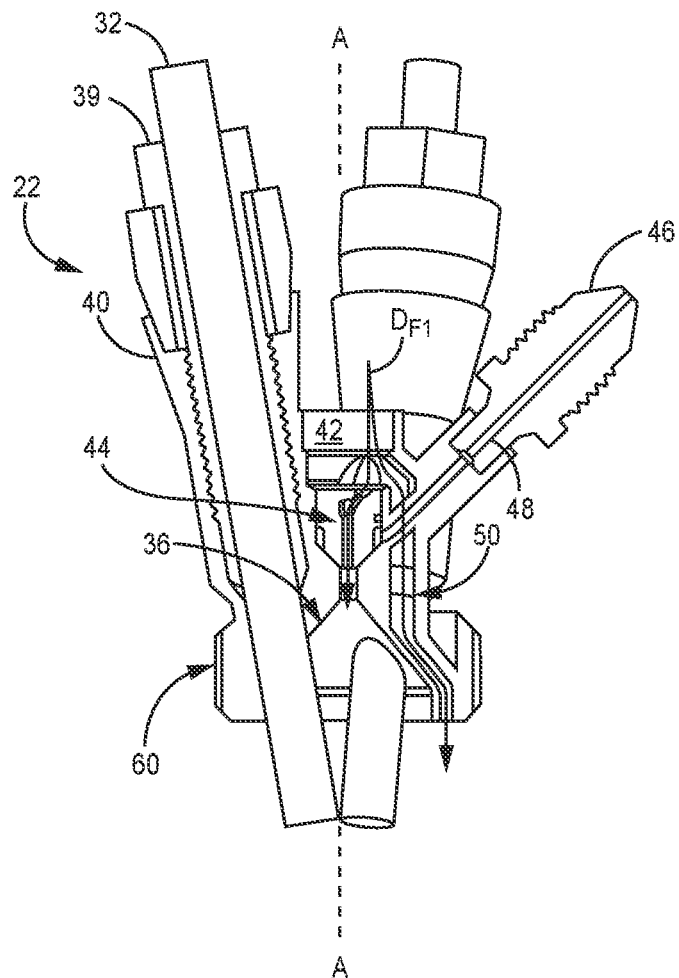
FIG. 4A is a cross-sectional view of an example of the removable igniter head of FIG. 3 showing a first air flow path through the igniter head.
Figure 4B:
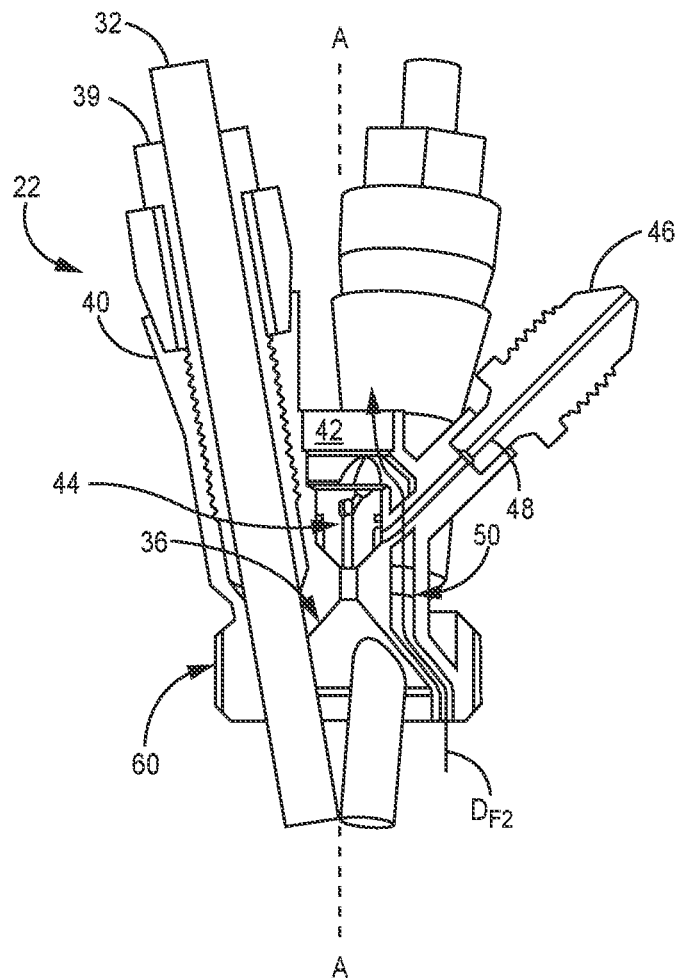
FIG. 4B is a cross-sectional view of an example of the removable igniter head of FIG. 3 showing a second air flow path through the igniter head.
Figure 4C:
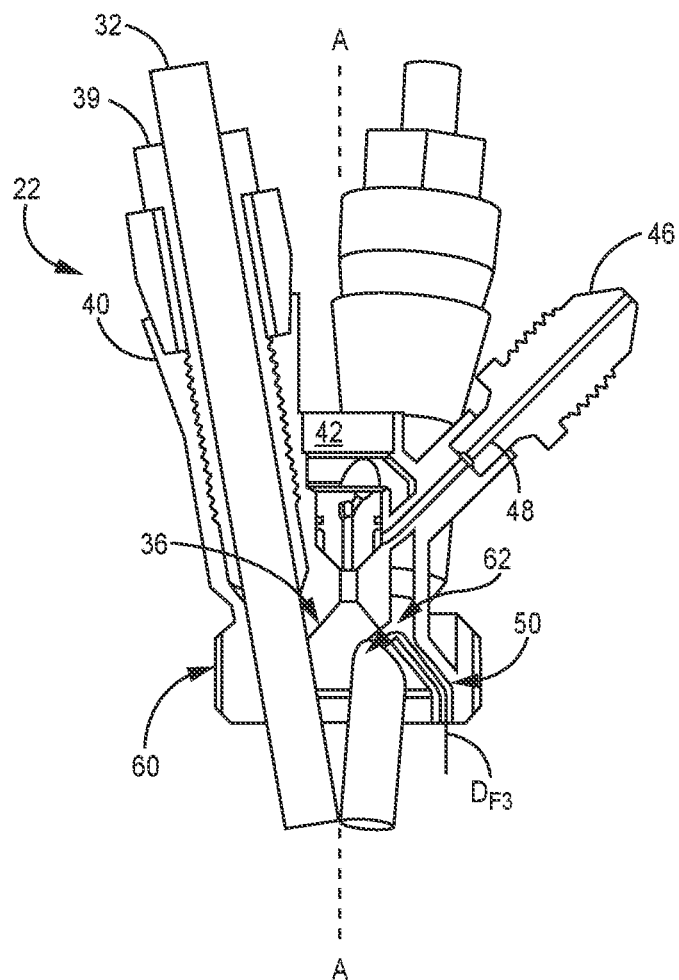
FIG. 4C is a cross-sectional view of an example of the removable igniter head of FIG. 3 showing a third air flow path through the igniter head.

FIGS. 4A-C structurally parallel FIG. 3 (discussed above), but show different air flow path configurations facilitated by channel 50. FIG. 4A illustrates flow path $D_{F1}$ through channel 50 of igniter head 22. Air flowing along flow path $D_{F1}$ is taken in at inlet 42. A portion of the air flows through air channel 44 to be used for atomizing liquid fuel from fuel channel 48, while the remainder of the air flows through channel 50. Air flowing through channel 50 can be fed into channels 52 of igniter body 20, as described previously.

FIG. 4B illustrates alternative flow path $D_{F2}$ through channel 50 of igniter head 22. Air flowing along flow path $D_{F2}$ is taken in to channel 50 opposite air inlet 42. The air can be taken in from, for example, channels 52. In examples where air flows through igniter head 22 according to flow path $D_{F2}$ and is taken in from channels 52, torch igniter 10 can be equipped with an additional air inlet disposed elsewhere along torch igniter 10 capable of channeling air into channels 52. The additional air inlet can take in air from, for example, the interior of high-pressure case 18 or from an auxiliary air compressor. A portion of air flowing through channel 50 according to flow path $D_{F2}$ can exit into an exterior of high-pressure case 18 through air inlet 42. Air flowing according to flow path $D_{F2}$ can also flow through air channel 44 to be used to atomize liquid fuel from fuel channel 48.

FIG. 4C illustrates alternative flow path $D_{F3}$ through channel 50. In examples of igniter head 22 where air flows according to $D_{F3}$, igniter head 22 also contains aperture 62, which extends through cap 36. As described above with respect to flow path $D_{F2}$, air flowing according to $D_{F3}$ is taken in at channel 50 opposite air inlet 42. Air flowing according to $D_{F3}$ flows into combustion chamber 28 through aperture 62 and can be used for combustion inside combustion chamber 28. Aperture 62 can also be configured to flow air flowing along flow path $D_{F3}$ into combustion chamber 28 with a swirl relative to axis A-A, improving uniformity of distribution of air flowing into combustion chamber 28 along flow path $D_{F3}$.

Figure 5:
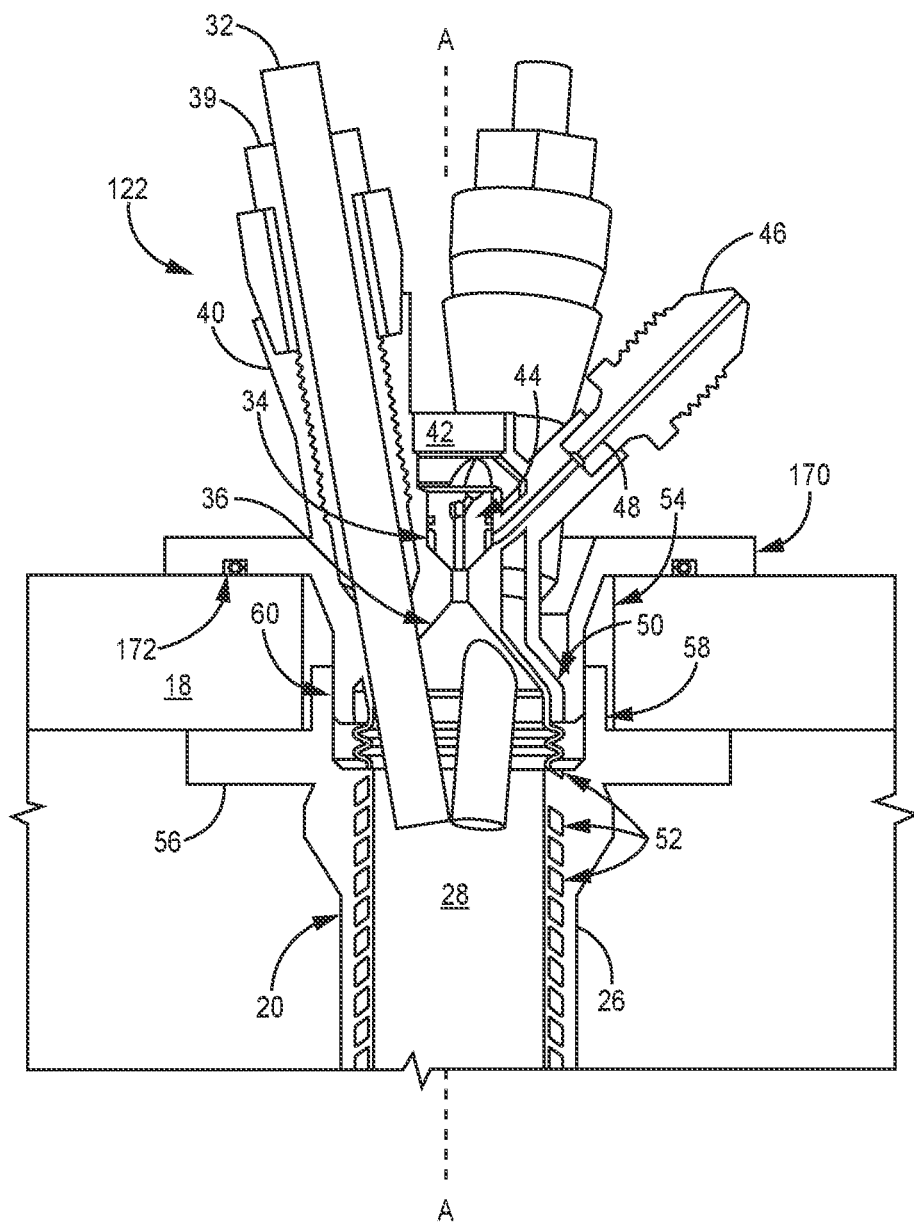
FIG. 5 is a cross-sectional view of the removable igniter head of FIGS. 1 and 2, secured with a sealing flange.

FIG. 5 is a cross-sectional view of torch igniter 10 configured with igniter head 122, which is substantially the same as igniter head 22 except for the addition of sealing flange 170. Sealing flange 170 extends annularly about igniter head 22 and abuts the exterior surface of high-pressure case 18. Sealing flange 170 also includes a groove that contains seal 172, which forms a seal between sealing flange 170 and the exterior of high-pressure case 18. In the depicted example, seal 172 is a c-seal, but it should be understood that seal 172 can be any suitable sealing structure.

In at least some examples, igniter body 20 and igniter head 22 of torch igniter 10 are formed as monolithic pieces via additive manufacturing. Igniter body 20 and igniter head 22 can be formed in an attached position or can be formed separately and attached in a later step. Generally, the relative sizes of igniter body 20 and igniter head 22 allow for thermal expansion at an operating temperature of the gas turbine engine. More generally, all components of torch igniter 10 can be formed partially or entirely by additive manufacturing. For example, cap 36 can be formed separately from a ceramic material and joined to igniter head 22 via, for example, brazing. Similarly, surface igniter 32 and sheath 39 can be formed separately by another suitable manufacturing process, including in examples where torch igniter 10 is otherwise formed monolithically. Surface igniters 32 can also be electrically connected to a power source via a separate manufacturing step.

For metal components (e.g., Inconel, high-temperature steel, other nickel alloys, etc.) exemplary additive manufacturing processes include but are not limited to powder bed fusion techniques such as direct metal laser sintering (DMLS), laser net shape manufacturing (LNSM), electron beam manufacturing (EBM). Support-free additive manufacturing techniques, such as binder jetting, can also be used to form components of any torch igniter disclosed herein. Additive manufacturing is particularly useful in obtaining unique geometries (e.g., channels 50 and 52) and for reducing the need for welds or other attachments (e.g., between housing 26 and outlet housing 30). However, other suitable manufacturing process can be used. For example, igniter sheath 39, igniter housing 40, cap 36 and the components of fuel injector 34 can be fabricated separately and joined via later manufacturing steps, such as brazing, welding or compression fitting. In these examples, components of igniter head 22 can be sized to allow for thermal expansion at an operating temperature of the gas turbine engine. For example, due to the increased heat load experienced by cap 36 during operation of torch igniter 10, cap 36 can be sized to allow for differential thermal expansion relative to other components of igniter head 22 at an operating temperature of the gas turbine engine.

The embodiments disclosed herein allow for the construction of torch igniters mounted inside a high-pressure case of a gas turbine engine and having removable igniter heads accessible from the exterior of the high-pressure case. Components likely to need maintenance or replacement are localized on the igniter head in the embodiments disclosed herein. As such, the embodiments disclosed herein allow for an igniter head that has been damaged or otherwise requires maintenance to be swapped for a new torch igniter head, decreasing non-operational time associated with maintenance of torch igniters used in gas turbine engines.

Discussion of Possible Embodiments

The following are non-exclusive descriptions of possible embodiments of the present invention.

An embodiment of a torch igniter for a combustor of a gas turbine engine includes an igniter body and an igniter head. The igniter body is disposed within a high-pressure case of a gas turbine engine and extends primarily along a first axis, and includes an annular wall and an outlet wall. The annular wall surrounds the first axis and defines a radial extent of a combustion chamber therewithin. The outlet wall is disposed at a downstream end of the annular wall, defines a downstream extent of the combustion chamber, and includes an outlet fluidly communicating between the combustion chamber and an interior of the combustor. The igniter head is removably attached to the igniter body at an upstream end of the annular wall, wherein the igniter head defines an upstream extent of the combustion chamber, and includes an ignition source extending at least partially into the combustion chamber and a fuel injector configured to inject fuel into the combustion chamber with an orientation impinging on the ignition source.

The torch igniter of the preceding paragraph can optionally include, additionally and/or alternatively, any one or more of the following features, configurations and/or additional components:

A torch igniter for a combustor of a gas turbine engine includes an igniter body and an igniter head. The igniter body is disposed within a high-pressure case of a gas turbine engine and extends primarily along a first axis, and includes an annular wall and an outlet wall. The annular wall surrounds the first axis and defines a radial extent of a combustion chamber therewithin. The outlet wall is disposed at a downstream end of the annular wall, defines a downstream extent of the combustion chamber, and includes an outlet fluidly communicating between the combustion chamber and an interior of the combustor. The igniter head is removably attached to the igniter body at an upstream end of the annular wall, wherein the igniter head defines an upstream extent of the combustion chamber, and includes an ignition source extending at least partially into the combustion chamber and a fuel injector configured to inject fuel into the combustion chamber with an orientation impinging on the ignition source.

A further embodiment of the foregoing torch igniter, wherein the igniter head further comprises a cap defining the upstream extent of the combustion chamber.

A further embodiment of any of the foregoing torch igniters, wherein the cap comprises a ceramic material.

A further embodiment of any of the foregoing torch igniters, further comprising an aperture in a wall of the high-pressure case through which the igniter head extends.

A further embodiment of any of the foregoing torch igniters, further comprising a flange extending from an exterior of the annular wall A further embodiment of any of the foregoing torch igniters, wherein the flange is configured to create a seal with an inner surface of the high-pressure case and the seal is configured to prevent air flow through the aperture.

A further embodiment of any of the foregoing torch igniters, wherein a pressure of air of the high-pressure case presses the flange against the inner surface of the high-pressure case to create the seal.

A further embodiment of any of the foregoing torch igniters, wherein the flange extends transverse to the axis.

A further embodiment of any of the foregoing torch igniters, further comprising a second flange extending from an exterior of the igniter head.

A further embodiment of any of the foregoing torch igniters, wherein the second flange is configured to create a second seal with an outer surface of the high pressure case and the second seal is configured to prevent flow across the high-pressure case.

A further embodiment of any of the foregoing torch igniters, wherein the second seal is formed by a sealing structure disposed in a groove of the second flange adjacent to the exterior of the outer surface of the high-pressure case.

A further embodiment of any of the foregoing torch igniters, wherein the second flange extends transverse to the axis.

A further embodiment of any of the foregoing torch igniters, further comprising a first cooling air passage formed within the annular wall, A further embodiment of any of the foregoing torch igniters, wherein the first cooling air passage surrounds the combustion chamber and is configured to cool an interior surface of the annular wall.

A further embodiment of any of the foregoing torch igniters, further comprising a second cooling air passage formed within the igniter head.

A further embodiment of any of the foregoing torch igniters, wherein the second cooling air passage is directly fluidly connected to the first cooling air passage.

A further embodiment of any of the foregoing torch igniters, wherein the second cooling air passage is configured to cool the igniter head.

A further embodiment of any of the foregoing torch igniters, further comprising an air inlet disposed in the igniter head and directly fluidly connected to the second cooling air passage.

A further embodiment of any of the foregoing torch igniters, wherein the air inlet is configured to intake a flow of air from a compressed air source.

A further embodiment of any of the foregoing torch igniters, wherein the air inlet is configured to flow a first portion of the flow of air to the fuel injector and to flow a second portion of the flow of air to the second air cooling passage.

A further embodiment of any of the foregoing torch igniters, wherein the fuel injector is configured to atomize an injected fuel with the first portion of the flow of air.

A further embodiment of any of the foregoing torch igniters, wherein the second cooling air passage is configured to channel the second portion of the flow of air to the first cooling air passage.

A further embodiment of any of the foregoing torch igniters, further comprising an air inlet disposed in the igniter body and directly fluidly connected to the first cooling air passage.

A further embodiment of any of the foregoing torch igniters, wherein the air inlet is configured to intake a flow of compressed air from inside the high-pressure case.

A further embodiment of any of the foregoing torch igniters, wherein the first cooling air passage is configured to channel the flow of air to the second cooling air passage.

A further embodiment of any of the foregoing torch igniters, wherein the second cooling air passage is configured to channel the flow of air to the fuel injector.

A further embodiment of any of the foregoing torch igniters, wherein the fuel injector is configured to atomize an injected fuel with the flow of air.

A further embodiment of any of the foregoing torch igniters, further comprising an aperture extending through the cap, wherein the aperture directly fluidly connects the second cooling air passage to the combustion chamber.

A further embodiment of any of the foregoing torch igniters, the first cooling air passage is configured to channel the flow of air to the second cooling air passage.

A further embodiment of any of the foregoing torch igniters, the second cooling air passage is configured to channel the flow of air into the combustion chamber through the aperture.

A further embodiment of any of the foregoing torch igniters, wherein the igniter head is removably attached by a screw attachment.

A further embodiment of any of the foregoing torch igniters, wherein the screw attachment forms a seal between the igniter head and the igniter body.

A further embodiment of any of the foregoing torch igniters, further comprising a crush seal or a c-seal disposed between the igniter head and the igniter body that forms a seal between the igniter head and the igniter body.

A further embodiment of any of the foregoing torch igniters, wherein the ignition source is a glow plug.

A further embodiment of any of the foregoing torch igniters, wherein at least one of the igniter head and the igniter body is formed as a single monolithic piece.

A further embodiment of any of the foregoing torch igniters, wherein the igniter body further comprises a receiving structure disposed at disposed at the upstream extent of the combustion chamber and the receiving structure is configured to receive the igniter head.

A further embodiment of any of the foregoing torch igniters, wherein the receiving structure is configured to create a seal between the igniter head and the igniter body.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A torch igniter for a combustor of a gas turbine engine, the torch igniter comprising:
   an igniter body disposed within a high-pressure case of the gas turbine engine and extending primarily along a first axis, the igniter body comprising:
      an annular wall surrounding the first axis and defining a radial extent of a combustion chamber therewithin; and an outlet wall disposed at a downstream end of the annular wall, and defining a downstream extent of the combustion chamber, the outlet wall including an outlet fluidly communicating between the combustion chamber and an interior of the combustor;

an igniter head removably attached to the igniter body at an upstream end of the annular wall, wherein the igniter head defines an upstream extent of the combustion chamber, and comprises:

an ignition source extending at least partially into the combustion chamber; and a fuel injector configured to inject fuel into the combustion chamber with an orientation impinging on the ignition source wherein the igniter head extends through the high-pressure case and at least partially outside of the high-pressure case.

2. The torch igniter of claim 1, wherein the igniter head further comprises a cap defining the upstream extent of the combustion chamber.

3. The torch igniter of claim 1, further comprising an aperture in a wall of the high-pressure case through which the igniter head extends.

4. The torch igniter of claim 3, further comprising a flange extending from an exterior of the annular wall, wherein the flange is configured to create a seal with an inner surface of the high-pressure case and the seal is configured to prevent air flow through the aperture.

5. The torch igniter of claim 4, wherein a pressure of air of the high-pressure case presses the flange against the inner surface of the high-pressure case to create the seal.

6. The torch igniter of claim 4, wherein the flange extends transverse to the axis.

7. The torch igniter of claim 4, further comprising a second flange extending from an exterior of the igniter head, wherein the second flange is configured to create a second seal with an outer surface of the high pressure case and the second seal is configured to prevent flow out of the high-pressure case.

8. The torch igniter of claim 7, wherein the second seal is formed by a sealing structure disposed in a groove of the second flange adjacent to the exterior of the outer surface of the high-pressure case.

9. The torch igniter of claim 7, wherein the second flange extends transverse to the axis.

10. The torch igniter of claim 1, further comprising a first cooling air passage formed within the annular wall, wherein the first cooling air passage surrounds the combustion chamber and is configured to cool an interior surface of the annular wall.

11. The torch igniter of claim 10, further comprising a second cooling air passage formed within the igniter head, wherein the second cooling air passage is directly fluidly connected to the first cooling air passage.

12. The torch igniter of claim 11, further comprising an air inlet disposed in the igniter head and directly fluidly connected to the second cooling air passage, wherein:

the air inlet is configured to intake a flow of air from a compressed air source, to flow a first portion of the flow of air to the fuel injector, and to flow a second portion of the flow of air to the second air cooling passage;

the fuel injector is configured to atomize an injected fuel with the first portion of the flow of air; and the second cooling air passage is configured to channel the second portion of the flow of air to the first cooling air passage.

13. The torch igniter of claim 11, further comprising an air inlet disposed in the igniter body and directly fluidly connected to the first cooling air passage, wherein:

the air inlet is configured to intake a flow of compressed air from inside the high-pressure case;

the first cooling air passage is configured to channel the flow of air to the second cooling air passage;

the second cooling air passage is configured to channel the flow of air to the fuel injector; and the fuel injector is configured to atomize an injected fuel with the flow of air.

14. The torch igniter of claim 11, further comprising:

an air inlet disposed in the igniter body and directly fluidly connected to the first cooling air passage; and an aperture extending through the cap, wherein the aperture directly fluidly connects the second cooling air passage to the combustion chamber, wherein:

the first cooling air passage is configured to channel the flow of air to the second cooling air passage; and the second cooling air passage is configured to channel the flow of air into the combustion chamber through the aperture.

15. The torch igniter of claim 1, wherein the igniter head is removably attached by a screw attachment.

16. The torch igniter of claim 15, wherein the screw attachment forms a seal between the igniter head and the igniter body.

17. The torch igniter of claim 1, wherein at least one of the igniter head and the igniter body is formed as a single monolithic piece.

18. The torch igniter of claim 1, wherein the igniter body further comprises a receiving structure disposed at the upstream extent of the combustion chamber and the receiving structure is configured to receive the igniter head.

19. The torch igniter of claim 18, wherein the receiving structure is configured to create a seal between the igniter head and the igniter body.

20. A torch igniter for a combustor of a gas turbine engine, the torch igniter comprising:

an igniter body disposed within a high-pressure case of the gas turbine engine and extending primarily along a first axis, the igniter body comprising:

an annular wall surrounding the first axis and defining a radial extent of a combustion chamber therewithin; and an outlet wall disposed at a downstream end of the annular wall, and defining a downstream extent of the combustion chamber, the outlet wall including an outlet fluidly communicating between the combustion chamber and an interior of the combustor;

an igniter head removably attached to the igniter body at an upstream end of the annular wall, wherein the igniter head defines an upstream extent of the combustion chamber, and comprises:

an ignition source extending at least partially into the combustion chamber; and a fuel injector configured to inject fuel into the combustion chamber with an orientation impinging on the ignition source; and a first cooling air passage formed within the annular wall, wherein the first cooling air passage surrounds the combustion chamber and is configured to cool an interior surface of the annular wall;

a second cooling air passage formed within the igniter head, wherein the second cooling air passage is directly fluidly connected to the first cooling air passage; and an air inlet disposed in the igniter body and directly fluidly connected to the first cooling air passage, wherein:
the air inlet is configured to intake a flow of compressed air from inside the high-pressure case;
the first cooling air passage is configured to channel the flow of air to the second cooling air passage;
the second cooling air passage is configured to channel the flow of air to the fuel injector; and
the fuel injector is configured to atomize an injected fuel with the flow of air.

* * * * *